(No Model.)

C. F. PEASE.
SPROCKET WHEEL.

No. 596,246. Patented Dec. 28, 1897.

Witnesses
Martha Pease
May McCrery

Inventor
Charles F. Pease.

UNITED STATES PATENT OFFICE.

CHARLES F. PEASE, OF BALTIMORE, MARYLAND.

SPROCKET-WHEEL.

SPECIFICATION forming part of Letters Patent No. 596,246, dated December 28, 1897.

Application filed March 10, 1897. Serial No. 626,751. (No model.)

*To all whom it may concern:*

Be it known that I, CHARLES F. PEASE, a citizen of the United States, residing at Baltimore, State of Maryland, have invented a new and useful Improvement in Sprocket-Wheels, of which the following is a specification.

My invention relates to an improvement in sprocket-wheels in the order of an attachment whereby the size of a sprocket-wheel may be increased without changing the original sprocket, and is particularly applicable to bicycles for the purpose of changing the gear or speed by enlarging the size of either front or rear sprocket, or both.

Figure 1:
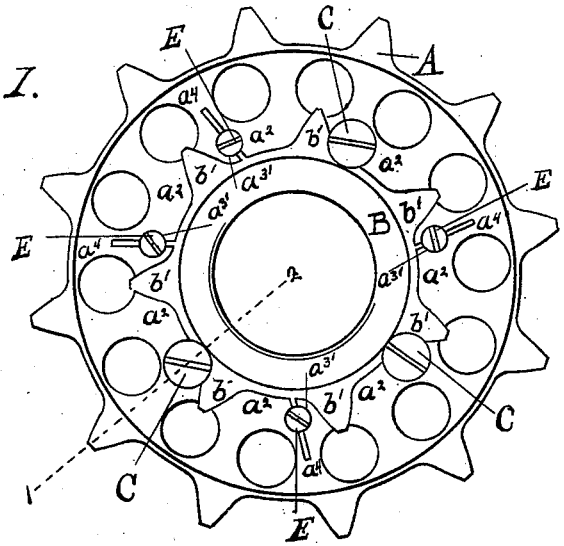
Figure 3:
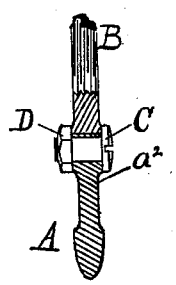
Figure 4:
Figure 2:
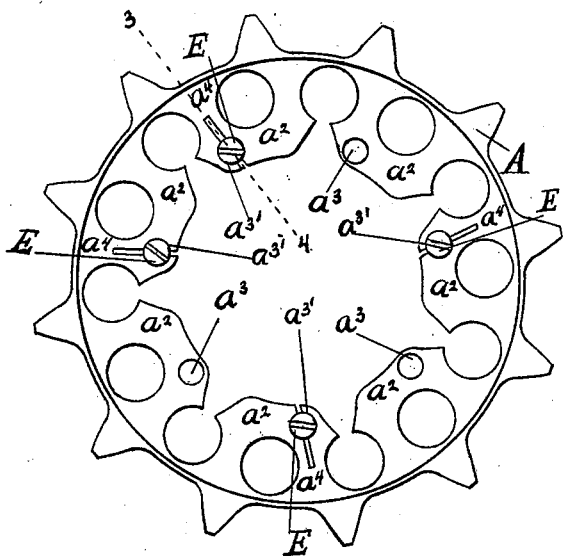

In the accompanying drawings, Figure 1 is a full-sized view of my invention applied to a detached rear or driven sprocket of a bicycle. Fig. 2 shows the same detached from the smaller sprocket. Fig. 3 shows a section through 1 2, Fig. 1, of small sprocket and attached sprocket, showing clamp-bolt. Fig. 4 is a section through 3 4, Fig. 2, of larger sprocket, showing expanding-screw.

Similar letters refer to similar parts throughout the several views.

In Fig. 1, A is a rim formed as a sprocket-wheel on its periphery and with its inner edge cut out at intervals to fit over the teeth $b'$ $b'$ of the sprocket-wheel B, the short arms or projections $a^2$ $a^2$ thereby left having a bearing upon the periphery between the teeth $b'$ $b'$ of sprocket B. The sprocket-rim A is held in place upon the periphery of sprocket B by several flanged headed bolts or screws C C, passed through holes $a^3$ $a^3$, Fig. 2, made for their reception near the lower edge of the arms $a^2$ $a^2$ and held in place by nuts D D, screwed tightly on their threaded ends. The heads of bolts C C and nuts D D, projecting over the edge of arms $a^2$ $a^2$, form a bearing against the sides of sprocket B and also arms $a^2$ $a^2$, which should be provided of a corresponding thickness, thereby holding the rim A securely and coincident with the plane of the teeth $b'$ $b'$ of sprocket B.

Alternating as nearly as possible with bolts C C, and in about the same relative position in arms $a^2$ $a^2$, I place tapered expanding-screws E E in holes $a^{31}$ $a^{31}$, threaded to receive them. From the lower edge of arms $a^2$ $a^2$ and passing outwardly through the holes $a^{31}$ $a^{31}$, made for the reception of screws E E, are provided slits $a^4$ $a^4$ to allow the expansion of arms $a^2$ $a^2$ against teeth $b'$ $b'$ of sprocket B, when tapered expanding-screws E E are tightened in them, and thus further secure sprocket A to the teeth of smaller sprocket B.

In practice it is not always necessary to provide or use both the clamp-bolts C C and expanding-screws E E, as either in sufficient numbers are effective in securing the sprocket-rim in place, and I do not confine myself strictly to either of these methods of fastening as herein specified, as they can be varied to a large extent without departing from the general nature of my invention.

In application my invention has a wide field of usefulness, notably where applied to the bicycle now in use. With my sprocket it is possible to improve on the now common use of small sprockets by enlarging both front and rear sprockets to a size more in keeping with correct mechanical principles without the expense of removing or altering the original sprockets, and when a bicycle is so equipped the rider has the additional advantage of four changes of gear by the removal of either or both of said sprocket-wheel rims.

What I claim, and desire to secure by Letters Patent, is—

1. A sprocket-wheel rim provided with projections on its inner surface adapted to engage on the periphery between the teeth of a sprocket-wheel of a smaller diameter, and means for expanding said projections against the edges of the teeth of the smaller sprocket by a tapered screw or plug and slot, substantially as described.

2. A sprocket-wheel rim having short inner arms of equal length attached thereto, said arms being adapted to fit upon the periphery between and against the base of the teeth of a smaller sprocket and means for expanding the ends of said arms for the purpose of fastening said rim to said sprocket-wheel, substantially as described.

3. The combination of sprocket-wheel rim A having its inner edge adapted to fit upon the periphery between and against the edges of the teeth, $b'$ $b'$ of smaller sprocket B, with bolts C, nuts D and expanding-screws E placed in slots $a^4$, for holding sprocket-rim A in place on sprocket B, substantially as described.

4. The combination of sprocket-wheel rim A having its inner edge adapted to fit upon the periphery between and against the edges of the teeth of smaller sprocket B, with expanding-screw E placed in slot $a^4$, for holding sprocket-rim A in place on sprocket-wheel B, substantially as described.

In testimony whereof I affix my signature in presence of two witnesses.

CHARLES F. PEASE.

Witnesses:
WM. N. WAMSLEY,
WM. M. MEIR.